United States Patent [19]

Dildy, Jr.

[11] 3,778,814

[45] Dec. 11, 1973

[54] WAVEFORM SYNTHESIZER

[75] Inventor: Clell A. Dildy, Jr., Panama City, Fla.

[73] Assignee: The United States of America as represented by the Secretary of the Navy, Washington, D.C.

[22] Filed: Aug. 7, 1972

[21] Appl. No.: 278,662

[52] U.S. Cl. ............... 340/347 DA, 328/14, 328/27
[51] Int. Cl. ....................... H03k 13/00, H03b 19/00
[58] Field of Search ................ 340/347 DA; 328/14, 328/27; 235/197, 186; 307/223, 261

[56] References Cited

UNITED STATES PATENTS

| | | | |
|---|---|---|---|
| 3,657,657 | 4/1972 | Jefferson | 328/27 |
| 3,713,137 | 1/1973 | Stone | 340/347 DA |
| 3,500,213 | 3/1970 | Ameau | 328/14 |
| 3,641,566 | 2/1972 | Konrad et al. | 340/347 DA |

*Primary Examiner*—Thomas A. Robinson
*Attorney*—Richard S. Sciascia et al.

[57] ABSTRACT

A signal waveform synthesizer system is disclosed as containing a digital input decade counter, a four to 10 line decoder and a flip-flop operatively connected to said decade counter. Said decoder has the 10 outputs thereof interconnected and grounded, respectively, and connected to a voltage divider network for producing consecutive output voltages in such manner as to generate a predetermined first half-cycle analog waveform. A direct current blocking capacitor allows the aforesaid flip-flop to timely reverse the polarity of the reference voltage supplied to said voltage divider network, to thereby effect a second half-cycle analog waveform that is equal and opposite to the aforesaid first half-cycle analog waveform, thereby effectively synthesizing a whole cycle, sinusoidal-like, output analog signal.

8 Claims, 4 Drawing Figures

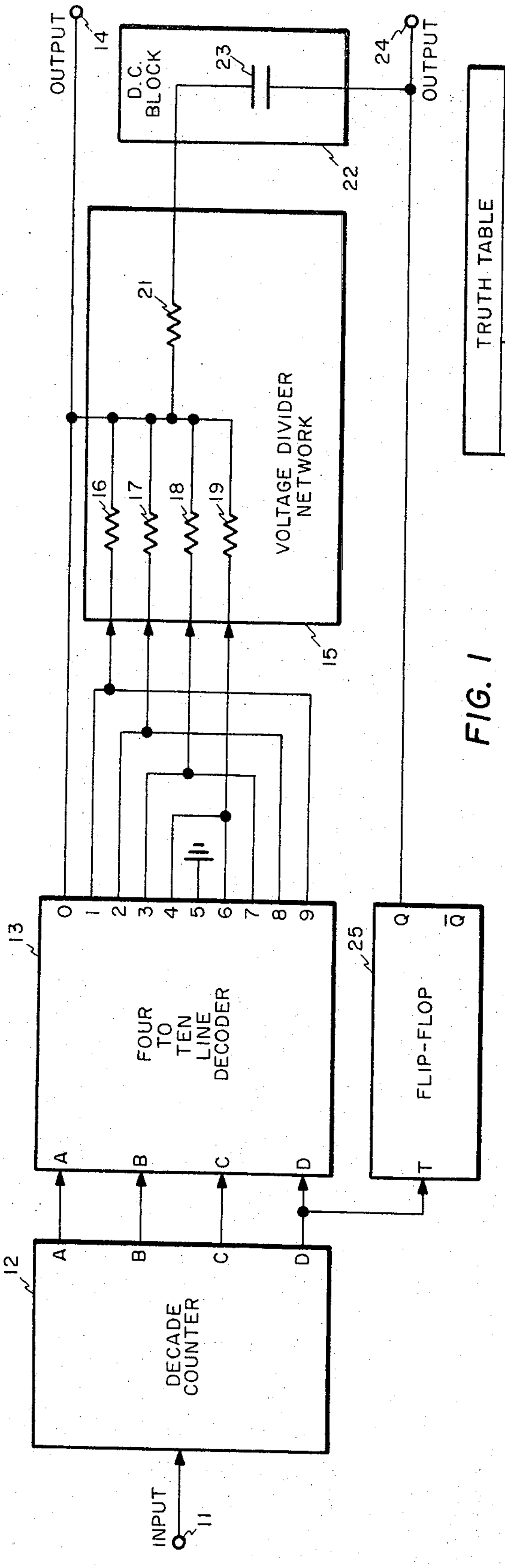
FIG. 1
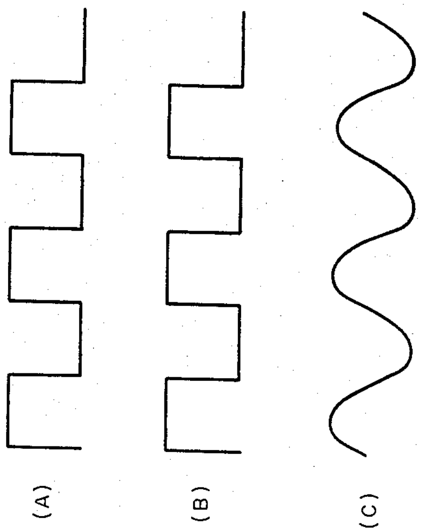
FIG. 2
TRUTH TABLE
| COUNT | OUTPUTS D | C | B | A |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
FIG. 3
TRUTH TABLE
| INPUTS | | | | OUTPUTS | | | | | | | | | |
|---|---|---|---|---|---|---|---|---|---|---|---|---|---|
| D | C | B | A | 0 | 1 | 2 | 3 | 4 | 5 | 6 | 7 | 8 | 9 |
| 0 | 0 | 0 | 0 | 0 | X | X | X | X | X | X | X | X | X |
| 0 | 0 | 0 | 1 | X | 0 | X | X | X | X | X | X | X | X |
| 0 | 0 | 1 | 0 | X | X | 0 | X | X | X | X | X | X | X |
| 0 | 0 | 1 | 1 | X | X | X | 0 | X | X | X | X | X | X |
| 0 | 1 | 0 | 0 | X | X | X | X | 0 | X | X | X | X | X |
| 0 | 1 | 0 | 1 | X | X | X | X | X | 0 | X | X | X | X |
| 0 | 1 | 1 | 0 | X | X | X | X | X | X | 0 | X | X | X |
| 0 | 1 | 1 | 1 | X | X | X | X | X | X | X | 0 | X | X |
| 1 | 0 | 0 | 0 | X | X | X | X | X | X | X | X | 0 | X |
| 1 | 0 | 0 | 1 | X | X | X | X | X | X | X | X | X | 0 |
| 1 | 0 | 1 | 0 | X | X | X | X | X | X | X | X | X | X |
| 1 | 0 | 1 | 1 | X | X | X | X | X | X | X | X | X | X |
| 1 | 1 | 0 | 0 | X | X | X | X | X | X | X | X | X | X |
| 1 | 1 | 0 | 1 | X | X | X | X | X | X | X | X | X | X |
| 1 | 1 | 1 | 0 | X | X | X | X | X | X | X | X | X | X |
| 1 | 1 | 1 | 1 | X | X | X | X | X | X | X | X | X | X |
FIG. 4

WAVEFORM SYNTHESIZER

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention relates, in general, to data signal processing systems and, in particular, pertains to digital-to-analog signal converters. In even greater particularity, it is an improved method and means for converting a squarewave signal to a predetermined sine wave or other signal.

DESCRIPTION OF THE PRIOR ART

Heretofore, generation of approximately sinusoidal waveforms has been effected by digital and other methods and means. For example, oscillators have been combined with RC filters, but it has been found that in such combinations the capacitors incorporated therein are limited to only a few picofarads, are voltage dependent, and normally are of wide tolerance. In addition, a system such as that described at pages 97 to 105 of the IEEE Transactions on Instruments and Measurement, Volume IM-18, No. 2, dated June 1969, has been employed, but it, relatively speaking, involves the principle of nonrecursive digital filters and is, thus, comprised of shift registers, filters, and a considerable amount of other complex circuitry and components. More simplified but perhaps less efficient methods and means have also been employed to convert square waves to sine waves, such as filter systems to suppress the harmonics of the fundamental frequency thereof, and use of digital filters with a pass frequency dependent upon the input frequency, substantially similar to that disclosed in the above mentioned IEEE article, but including curve smoothing refinements.

For many practical purposes, the aforementioned prior art devices have worked satisfactorily. However, in some instances — particularly with respect to accuracy, simplicity, compactness, efficiency, extent of utility, and the like — they also leave something to be desired.

SUMMARY OF THE INVENTION

The instant invention overcomes many of the disadvantages of the prior art devices, in that it will produce a sine wave signal from a square wave signal over an extremely wide frequency band, and it will do it automatically. Moreover, it produces said sine wave with considerably less components, which makes it easier and more economical to manufacture. Thus, it is deemed an advance in the art and, in many respects, constitutes an improvement thereover.

It is, therefore, an object of this invention to provide an improved digital-to-analog converter.

Another object of this invention is to provide an improved signal waveform synthesizer.

Another object of this invention is to provide a method and means of automatically converting square wave signals to sine wave signals within a broad band of frequencies.

Still another object of this invention is to provide a square wave to sine wave converter of simple structure and of small size.

A further object of this invention is to provide a square wave to sine wave converter having improved waveform accuracy and fidelity.

Another object of this invention is to provide an improved method and means for producing a predetermined sinusoidal-like signal waveform from any given square wave-like input signal.

Still another object of this invention is to provide a digital-to-analog converter that is more easily and economically manufactured, used, maintained, and stored.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a block diagram of the square wave to sine wave converter system constituting the subject invention;

FIG. 2 is a graphical representation of a typical input and output signals supplied to and received from the system of FIG. 1;

FIG. 3 is a representative truth table which defines the internal functions of the decade counter of the system of FIG. 1; and FIG. 4 is a truth table which defines the internal functions of the four to ten line decoder of the system of FIG. 1.

DESCRIPTION OF THE PREFERRED EMBODIMENT

Referring now to FIG. 1, there is shown an input terminal 11 which is connected to the input of a decade counter 12 which, for example, may be a SN7490 type decade counter manufactured by and commercially available from the Texas Instrument Company, Inc., of Dallas, Texas, and the disclosure of which is presented at pages 8-1 through 8-5 of Texas Instruments catalog CC201, dated Aug. 1, 1969.

As mentioned in said catalog, the subject decade counter is a high-speed, monolithic decade counter consisting of four dual-rank, master-slave flip-flops internally connected to provide a divide-by-two counter and a divide-by-five counter. Gated direct reset lines are provided to inhibit count inputs and return all outputs to logical zero or to a binary coded decimal count of nine. Furthermore, as explained in said catalog, connections may be made in such manner as to make the count separated into three independent count modes, as desired. Of course, from the teachings presented herewith and the teachings presented in said Texas Instruments catalog CC201, it would be well within the purview of one skilled in the art to properly connect decade counter 12, both internally and externally as necessary to optimize the operation of the subject invention.

As may readily be seen, decade counter 12 has four outputs which are respectively defined as being outputs A, B, C, and D, which correspond to the A, B, C, and D outputs disclosed in the truth table of FIG. 3. Said outputs of decade counter 12 are thus connected to four inputs of a four to 10 line decoder 13, the inputs of which are likewise defined by A, B, C, and D, respectively.

Said four to 10 line decoder 13 may, for example, be of the SN74145 type decoder manufactured by and commercially available from Texas Instruments, Inc., of Dallas, Texas, and disclosed in detail at pages 5-13 through 5-18 of said Texas Instruments integrated circuits catalog CC201, dated Aug. 1, 1969. In this particular instance, said four to 10 line decoder 13 is a monolithic binary coded decimal-to-decimal decoder consisting of eight inverters and 10 four input NAND gates. The inverters are connected in pairs to make the binary coded decimal input data available for decoding by the NAND gates. Full decoding of valid binary coded decimal input logic insures that all outputs remain off for all invalid binary input conditions. In this particular instance, four to 10 line decoder 13 functions in accordance with the truth table depicted in FIG. 4.

As may readily be seen in FIG. 1, decoder 13 has ten outputs which are herein numbered as being from zero to nine. The zero output thereof is connected to an output terminal 14, which in this particular instance, constitutes the sine wave output terminal. Output terminals 1 and 9 are interconnected, output terminals 2 and 8 are interconnected, output terminals 3 and 7 are interconnected, and output terminals 4 and 6 are interconnected, thereby effectively creating four separate outputs from decoder 13. The output number 5 is either grounded or open.

As may readily be seen, said four outputs are connected to a like number of inputs of a voltage divider network 15. More specifically, the interconnected 1 and 9 outputs of decoder 13 are connected to one of the terminals of a $R_1$ resistor 16, which preferably has a resistance of 4.3K ohms; the interconnected number 2 and 8 outputs are connected to the input terminal of a $R_2$ resistor 17, which preferably has a 15K ohms resistance; the interconnected 3 and 7 outputs are connected to an input terminal of a $R_3$ resistor 18, which preferably has 43K ohms resistance; and the interconnected 4 and 6 outputs are connected to the input terminal of a $R_4$ resistor 19, which preferably has a resistance of 200K ohms. The output terminals of each of said resistors 16 through 19 are interconnected, connected to the aforesaid output terminal 14, and connected to the input terminal of another $R_5$ resistor 21, which preferably has a resistance of 10K ohms. Of course, as may readily be seen, the aforementioned interconnected resistors 16, 17, 18, 19, and 21, constitute voltage divider network 15, with the output terminal of said resistor 21 — that is, the one connected to the interconnected terminals of resistors 16 through 19 — constituting the output of said voltage divider network 15.

The other terminal of resistor 21 of voltage divider 15 is connected to a direct current blocking element 22, which includes a 1 microfarad capacitor 23. Actually, the aforesaid resistor 21 is connected to one of the plates of said capacitor 23, with the other plate thereof constituting the input of said direct current blocking means 22, which is connected to the square wave signal output terminal 24.

The D output of the aforementioned decade counter 12 is also connected to the toggle input of a flip-flop 25 which, for instance, may be of the SN7472 type manufactured by and commercially available from Texas Instruments, Inc., of Dallas, Texas, and which is disclosed more fully between pages 2-26 and 2-28 of the aforementioned integrated circuits catalog CC201 from Texas Instruments dated Aug. 1, 1969. Flip-flop 25 has both a Q output and a $\overline{Q}$ output, with the Q output thereof connected to the aforementioned squarewave output terminal 24, and with the $\overline{Q}$ output thereof not connected to anything.

At this time, it should perhaps be understood that all of the elements and components depicted in the block diagram, whether in block form or in schematic form, constitute well known and conventional elements and components per se, respectively, and, therefore, it is also to be understood that it is their unique interconnections and interactions which combine to form the square wave-to-sine wave converter constituting this invention.

FIG. 2, being a graphical illustration of signal waveforms pertinent to the system of FIG. 1, will be discussed more fully blow during the discussion of the operation of the invention.

As previously mentioned, the A, B, C, and D outputs of truth table of FIG. 3 refer to the like outputs of the aforementioned decade counter 12, and the A, B, C, and D inputs of truth table of FIG. 4 refer to the A, B, C, and D inputs of four to ten line decoder 16, respectively. Also, the outputs of the truth table of FIG. 4 — that is, outputs zero through nine — refer to the comparable outputs of four to 10 line decoder 13 illustrated in FIG. 1. As previously mentioned, and as would be obvious to one skilled in the art, the truth tables of FIGS. 3 and 4 effectively define the operations of decade counter 12 and decoder 13, as they are disclosed in the aforesaid Texas Instruments catalog CC201. Accordingly, when considered in conjunction therewith, the disclosures of decade counter 12 and decoder 13 are obviously sufficient for one skilled in the art to make and use them as well as incorporate them within the subject invention as it is herewith disclosed in FIG. 1.

MODE OF OPERATION

The operation of the invention will now be discussed briefly in conjunction with all of the figures of the drawing.

A digital squarewave type of signal having a waveform substantially similar to that shown in FIG. 2(A) is supplied to input terminal 11 of the system of FIG. 1. Although not shown in FIG. 2, the time or frequency scales (the abscissas) are different to the extent that the frequency scale of the signal of FIG. 2(A) is 20 times the frequency scales of the waveforms of FIG. 2(B) and FIG. 2(C), the latter two of which are then obviously the same. In other words, the frequency of the squarewave signal of FIG. 2(A) is, in actual operation, 20 times that of each of the signals of FIG. 2(B) and FIG. 2(C).

From terminal 11, said digital input squarewave is supplied to decade counter 12 which divides it by 10 and produces four outputs (at outputs A, B, C, and D, respectively) that have a total of 10 distinct combinations of nodal states, thereby defining said input waveform by means of 10 pieces thereof.

Output D, as it timely occurs, causes a further division thereof by two, to be effected by flip-flop 25, which, in turn, causes a squarewave having the desired frequency — that is, one-twentieth of the frequency of the input signal — to be produced, with the waveform thereof being substantially similar to that shown in FIG. 2(B).

The A, B, C, and D outputs of decade counter 12 are respectively supplied to the A, B, C, and D inputs of a binary coded decimal decoder, such as four to 10 line decoder 13, which, in turn, produces an output at one of its outputs in accordance with the count in the aforesaid decade counter 12, as said counts — that is, said 0 to 9 counts — have their respective outputs defined in the truth table of FIG. 3. In other words, the 10 outputs of decoder 13 will be caused to be grounded in sequence, one at a time, in accordance with the truth table of FIG. 4, by the operation of said decoder 13, as a result of being supplied the A, B, C, and D outputs from decade counter 12 which are programmed in accordance with the counts of its operational truth table shown in FIG. 3.

Perhaps it would at this time be noteworthy, that as the Texas Instrument has developed the aforesaid decade counter 12 and four to ten line decoder 13, the truth tables respectively defining the internal functions thereof employ certain signified voltages or states therein. They are as follows:

For the truth table of FIG. 3, a logic zero equals 0 to 0.2 volts, and a logic one equals 3 to 5 volts; and For the truth table of FIG. 4, the zeros refer to ground, and the X's refer to open circuits.

The 10 outputs of decoder 13 are supplied to voltage resolving divider network 15, with the zero output thereof also being supplied to sinewave output terminal 14. Of course, the inputs to voltage divider network 15 are square waves having the desired frequency — that is, one-tenth of the input signal frequency.

The resolving resistors in the voltage divider network 15 are weighted in such manner as to synthesize an analog output signal having any desired waveform from a digital square wave input signal, in this particular preferred instance, to synthesize a sine wave. Hence, because a sine wave is desired to be generated by this particular preferred embodiment of the invention, $R_1$ resistor 16 has 4.3K ohms resistance, $R_2$ resistor 17 has 15K ohms resistance, $R_3$ resistor 18 has 43K ohms resistance, $R_4$ resistor 19 has 200K ohms resistance, and $R_5$ resistor 21 has 10K ohms resistance. Each of the two (that is the positive and negative) half cycles making up a whole sine wave cycle are timely and sequentially generated by said resistors in the disclosed combination of voltage divider network 15 and, thus, a sinusoidal output signal is produced thereby. To produce such a sinusoidal waveform, the operation is such that: for a zero count, the output is zero; for a one or a nine count, the output is sin 18° times the input; for a two or an eight count, the output is sin 36° times the input; for a three or seven count, the output is sin 54° times the input; for a four or six count, the output is sin 72° times the input; and for a five count, the output is the same as the input.

In order to effect the proper design of the aforesaid voltage divider network to cause a sine wave to be resolved, the following equations may be used to calculate the resistance of resistors 16 through 21, respectively:

$$R_1/(R_1 + R_5) = \sin 18°, \quad (1)$$

$$R_2/(R_2 + R_5) = \sin 36°, \quad (2)$$

$$R_3/(R_3 + R_5) = \sin 54°, \quad (3)$$

$$R_4/(R_4 + R_5) = \sin 72°, \quad (4)$$

where $R_1$ = resistance of resistor 16,
$R_2$ = resistance of resistor 17,
$R_3$ = resistance of resistor 18,
$R_4$ = resistance of resistor 19,
$R_5$ = the resistance of resistor 21 and is selected so as to provide whatever constant is necessary for the perfection of the predetermined output signal waveform desired.

Of course, the selection of all of said $R_1$ through $R_5$ resistors is contingent on the analog output signal desired, and not only on the aforesaid $R_5$. Hence, each or all thereof may be varied (or selected so as to be manually or otherwise adjustable) accordingly.

Obviously, it would be well within the purview of one skilled in the art having the benefit of the teachings presented herewith to select whatever resistor resistances as would effect the output signal waveform desired.

In this particular disclosed embodiment of the invention, after the occurrence of ten input pulses to decade counter 12, the output signal from output D thereof causes astable multivibrator or flip-flop 25 to toggle in accordance with the waveform of FIG. 2(B). As a result, the reference voltage supplied to voltage divider network 15 through direct current blocking capacitor 23 has the polarity thereof reversed, thereby causing the other half of the desired sinewave to be produced during the time the next 10 input pulses are supplied to decade counter 12 and effectively and timely to voltage divider network 15.

When both the "positive" half cycle and the "negative" half cycle are completed as a consequence of 20 squarewave signal cycles being supplied to the input terminal of the instant invention by any suitable, complementary source, a squarewave signal similar to that sown in FIG. 2(B) is produced at output terminal 24 and a sine wave signal similar to that depicted in FIG. 2(C) is produced at output terminal 14.

At this time, it might be of interest to note that a battery may be substituted for 1 microfarad direct current blocking capacitors 23, with the negative pole thereof connected to resistor 21 and the positive pole thereof connected to terminal 24. As a matter of fact, such arrangement might be preferable at low operational frequencies — say, below 10 cycles per second — so as to obviate the use of excessively large size capacitors.

Again, for the purpose of emphasis, it is hereby stated that the signal actually synthesized by the subject invention may, within limits, have any predetermined analog waveform desired. For example, in addition to producing sine waveforms, sinusoidal-like waveforms, and substantially symmetrical but oppositely polarized waveforms, the subject invention may be designed to produce sawtooth waveforms, curved ramp waveforms, stairstep waveforms, as well as indescribable and mathematically describable waveforms, and the like. Hence, this invention constitutes a versatile predetermined signal to predetermined signal converter that is unique in its structure and produces results superior to those produced by the known prior art. Accordingly, it is a considerable improvement over the devices of said prior art.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A signal wave form synthesizer, comprising in combination:

means, having an input and a plurality of outputs, for converting a single, digital, square wave signal supplied to the input thereof into a plurality of square wave signals at the plurality of outputs thereof, respectively, each square wave output signal of which has a frequency that is one-tenth of the frequency of the single, digital, square wave signal supplied to the input thereof;

means, having a plurality of inputs of like number as the plurality of outputs of said converting means and a plurality of outputs, with the plurality of inputs thereof respectively connected to the plurality of outputs of said converting means, for decoding the aforesaid plurality of square wave output signals therefrom into another plurality of signals having predetermined voltages, respectively, which are sequenced in accordance with a predetermined program;

means connected to the outputs of said decoding means for resolving the aforesaid plurality of predetermined sequenced voltage signals into a single analog signal having a waveform that is proportional to the voltages thereof; and means connected between one of the outputs of said converting means and one of the inputs of the aforesaid resolving means for timely reversing the reference polarity of said resolving means.

2. The device of claim 1, wherein said means having an input and a plurality of outputs, for converting a single, digital, square wave signal supplied to the input thereof into a plurality of square wave signals at the plurality of outputs thereof, respectively, each square wave output signal of which has a frequency that is one-tenth of the frequency of the single, digital, square wave signal supplied to the input thereof comprises a decade counter.

3. The device of claim 1, wherein said means, having a plurality of inputs of like number as the plurality of outputs of said converting means and a plurality of outputs, with the plurality of inputs thereof respectively connected to the plurality of outputs of said converting means, for decoding the aforesaid plurality of square-wave output signals therefrom into another plurality of signals having predetermined voltages, respectively, which are sequenced in accordance with a predetermined program comprises a four to ten line decoder.

4. The device of claim 1, wherein said means connected to the outputs of said decoding means for resolving the aforesaid plurality of predetermined sequential voltage signals into a single analog signal having a waveform that is proportional to the voltages thereof comprises a voltage divider network.

5. The device of claim 1, wherein said means connected between one of the outputs of said converting means and one of the inputs of said resolving means for timely reversing the reference polarity of said resolving means comprises:

a flip-flop having a toggle input and a pair of outputs, with the toggle input thereof connected to one of the outputs of said converting means; and means connected between one of the outputs of said flip-flop and the aforesaid one of the inputs of said resolving means for blocking the transfer of direct current voltage therebetween.

6. The device of claim 5, wherein said means connected between one of the outputs of said flip-flop and one of the inputs of said resolving means for blocking the transfer of direct current voltage therebetween comprises a capacitor.

7. A signal waveform synthesizer, comprising in combination:

an input terminal;

a decade counter having an input and a quartet of outputs, with the input thereof connected to said input terminal;

a four to 10 line decoder having a quartet of inputs and the outputs numbered between zero and nine, respectively, with the quartet of inputs thereof respectively connected to the quartet of outputs of said decade counter;

first means connected between the number one and number nine outputs of said four to 10 line decoder for effecting the electrical interconnection thereof;

second means connected between the number two and number eight outputs of said four to 10 line decoder for effecting the electrical interconnection thereof;

third means connected between the number three and number seven outputs of said four to 10 line decoder for effecting the electrical interconnection thereof;

fourth means connected between the number four and number six outputs of said four to 10 line decoder for effecting the electrical interconnection thereof;

fifth means connected to the number five output of said four to 10 line decoder for effecting the grounding thereof;

a quartet of resistors having one of the terminals thereof respectively connected to the aforesaid first, second, third, and fourth means;

an output terminal connected to the zero output of said four to 10 line decoder; and means connected to the other terminals of said quartet of resistors for effecting an electrical connection therebetween and said output terminal.

8. The invention of claim 7, further characterized by:

another resistor having a pair of terminals, with one of the terminals thereof connected to the aforesaid output terminal;

a capacitor effectively having a pair of plates, with one of the plates thereof connected to the other terminal of said another resistor; and a flip-flop having a toggle input and a pair of outputs, with the toggle input thereof connected to one of said quartet of outputs of said decade counter, and with one of the outputs thereof connected to the other plate of said capacitor.

* * * * *